(12) United States Patent  
Syngaevsky

(10) Patent No.: US 7,532,984 B2  
(45) Date of Patent: May 12, 2009

(54) METHOD AND SYSTEM FOR DETERMINING HYDROCARBON PROPERTIES

(75) Inventor: Alexander Syngaevsky, La Defense (FR)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 11/579,175

(22) PCT Filed: Apr. 29, 2005

(86) PCT No.: PCT/IB2005/001786

§ 371 (c)(1),
(2), (4) Date: Aug. 8, 2007

(87) PCT Pub. No.: WO2005/106190

PCT Pub. Date: Nov. 10, 2005

(65) Prior Publication Data

US 2008/0114547 A1    May 15, 2008

Related U.S. Application Data

(60) Provisional application No. 60/567,071, filed on Apr. 30, 2004.

(51) Int. Cl.
G01V 5/10   (2006.01)
G01V 9/00   (2006.01)
(52) U.S. Cl. .................. 702/13; 702/11; 702/12; 250/269.7
(58) Field of Classification Search ............. 702/11–14; 250/269.6, 269.7; 376/165
See application file for complete search history.

(56) References Cited

U.S. PATENT DOCUMENTS

| 3,928,762 A | | 12/1975 | Peelman et al. |
| 4,403,290 A | * | 9/1983 | Clavier et al. .................. 702/13 |
| 4,475,038 A | | 10/1984 | Lochmann et al. |
| 4,937,446 A | | 6/1990 | McKeon et al. |
| 5,699,246 A | | 12/1997 | Plasek et al. |

OTHER PUBLICATIONS

International Search Report for PCT/IB2005/001786 mailed Dec. 19, 2005 (2 pages).

* cited by examiner

*Primary Examiner*—John H Le
(74) *Attorney, Agent, or Firm*—Osha•Liang; Dona C. Edwards

(57) ABSTRACT

Method and system are disclosed for determining hydrocarbon CDVs in a multiphase environment. The method and system involve calculating a total hydrocarbons volume from an apparent oil volume and an apparent gas volume. The apparent oil volume is determined using C/O data from a nuclear logging tool operating in inelastic neutron scattering mode. The apparent gas volume is determined using neutron porosity data from a nuclear logging tool operating in pulsed neutron capture ("PNC") mode. It is also possible to determine the total hydrocarbons volume using log data from formation thermal neutron capture cross section measurements, or a cased hole formation resistivity tool. The total hydrocarbons volume is then used to back-calculate the total hydrocarbons CDV at various formation depths using the logged C/O data. The resulting independently calculated total hydrocarbon CDV may be used for proper matching of log data and simulation results for history matching purposes.

28 Claims, 10 Drawing Sheets

METHOD AND SYSTEM FOR DETERMINING HYDROCARBON PROPERTIES

This application claims priority from PCT/IB05/01786 filed on Apr. 29, 2005 which claims benefit of 60/567,071 filed Apr. 30, 2004.

BACKGROUND OF THE INVENTION

1. Field of the Invention

The invention relates generally to the quantitative determination of hydrocarbon properties. More specifically, the invention relates to a method and system for determining the carbon density values ("CDV") of the hydrocarbons using carbon/oxygen ("C/O") log data and hydrocarbon saturation estimates derived from cased hole pulsed neutron capture and/or formation resistivity logging tools.

2. History of the Related Art

As is well known in the petroleum production art, a significant amount of oil remains in an oil-bearing formation after waterflooding. A portion this residual oil may be recovered using various EOR (enhanced oil recovery) techniques, including water-alternated-gas ("WAG") injection. WAG involves the repeated injection of first gas, then water, into the formation from injection wells strategically placed around a production well. The injected gas takes up pore space in the formation that might otherwise be occupied by the oil, and the water subsequently sweeps the oil and the gas from the pore space, pushing them toward the production well. For more information regarding the WAG procedure, the reader is referred to U.S. Pat. No. 3,244,228 (Parrish).

Before beginning a full field WAG injection, a pilot WAG injection may be conducted to verify the sweep efficiency and to optimize the WAG parameters that will be used for the full field injection. Typically, an observation well is drilled in the formation at a predetermined distance (e.g., 140 meters) from the injection well. The observation well is used to monitor, among other things, the change in the saturation levels of the hydrocarbons in the formation, which may include oil, altered oil, and gas, during the pilot WAG injection. Ideally, assuming an immiscible environment, the saturation levels of the individual water, oil and gas phases in the formation may be determined and used to estimate the total hydrocarbons saturation level. This information may then be compared to the results predicted by a simulation model for history matching purposes.

It is difficult, however, to determine the saturation level of the individual phases in a multiphase environment (i.e., formation oil, injected gas, formation water, and injected water), such as that resulting from a WAG injection. For one thing, the oil and gas phases are actually miscible and their miscibility makes the determination extremely complicated, since the two phases cannot be easily separated. The determination becomes more challenging as the physical properties of the oil and gas change with depth and time and as the contrast between these physical properties decreases. Other factors such as segregation of oil and gas phases due to gravity further complicate the saturation determination. As a result, individual hydrocarbon saturation levels have typically been estimated from log data using one or more assumed or simulated values for the hydrocarbon properties, which may or may not be very accurate.

Accordingly, what is needed is a way to characterize hydrocarbons properties without having to first determine the individual oil and gas phase saturations. More particularly, what is needed is a way to determine a characteristic of the hydrocarbons, such as the CDV, that may then be used to characterize the hydrocarbons properties without having to first determine the individual oil and gas phase saturations.

SUMMARY OF THE INVENTION

The invention is directed to a method and system for determining total hydrocarbon CDV in a multiphase environment where the oil and gas phases are not immiscible. The method and system of the invention involve determining an apparent oil volume and an apparent gas volume at each depth level of investigation. The apparent oil volume is determined from C/O data and a baseline CDV previously computed from known oil properties. The apparent gas volume is determined using formation neutron porosity data. The apparent oil and gas volumes are then combined to obtain a total hydrocarbons volume. Alternatively, the total hydrocarbons volume can be determined based on water saturation, derived from formation thermal neutron capture cross-section, or from formation resistivity data. The CDV value used to determine the apparent oil volume is then adjusted at each depth level of investigation until the apparent oil volume matches the total hydrocarbons volume. The adjustment may be determined iteratively, or empirically, or using any other suitable technique known to those of ordinary skill in the art. The adjusted CDV profile may then be directly or indirectly compared with its counterparts derived from a compositional simulator model for history matching purposes.

In general, in one aspect, the invention is directed to a method for determining total hydrocarbons carbon density value (CDV) in a multiphase environment. The method comprises the steps of logging a wellbore for information, including carbon/oxygen log data and using the information from the wellbore to calculate apparent individual hydrocarbon saturations independently of individual hydrocarbons CDVs. The method further comprises the steps of calculating a total hydrocarbons saturation using the apparent individual hydrocarbon saturations and determining the total hydrocarbons CDV using the total hydrocarbons saturation calculated from the apparent individual hydrocarbon saturations and the carbon/oxygen log data.

In general, in another aspect, the invention is directed to a system for determining total hydrocarbons carbon density value (CDV) in a multiphase environment. The system comprises one or more databases having wellbore logging information stored thereon, including at least carbon/oxygen log data and a processing unit connected to the one or more databases. The processing unit includes a storage medium encoded with instructions for causing the processing unit to calculate apparent individual hydrocarbon saturations using the wellbore logging information independently of individual hydrocarbons CDVs and then calculate a total hydrocarbons saturation using the apparent individual hydrocarbon saturations. The processing unit thereafter determines the total hydrocarbons CDV using the total hydrocarbons saturation calculated from the apparent individual hydrocarbon saturations and the carbon/oxygen log data.

In general, in yet another aspect, the invention is directed to method of performing history matching for a simulated model of a multiphase environment. The method comprises the steps of calculating a total hydrocarbons saturation and determining a total hydrocarbons CDV from the total hydrocarbons saturation. The method comprises the steps of comparing the total hydrocarbons CDV to a simulated hydrocarbons CDV calculated from the simulated model of the multiphase environment and adjusting the simulated model of the multiphase environment based on the comparison of the total hydrocarbons CDV and the simulated hydrocarbons CDV.

In general, in still another aspect, the invention is directed to a method for determining total hydrocarbons carbon density value (CDV) in a multiphase environment. The method comprises the steps of logging a wellbore for information, including formation resistivity log data, and using the formation resistivity log data to calculate a total hydrocarbons saturation. The method comprises the step of determining the total hydrocarbons CDV using the total hydrocarbons saturation calculated from the formation resistivity log data.

Advantages and other features of the invention will become apparent from the following drawings, description, and claims.

BRIEF DESCRIPTION OF THE DRAWINGS

A more complete understanding of the invention may be had by reference to the accompanying detailed description when taken in conjunction with the following drawings, wherein.

DETAILED DESCRIPTION OF ILLUSTRATIVE EMBODIMENTS

As mentioned previously, the invention is directed to a method and system for determining hydrocarbon CDV in a multiphase environment where the oil and gas phases are not immiscible. The method and system involve calculating a total hydrocarbons volume from an apparent oil volume and an apparent gas volume. The apparent oil volume is determined using C/O data from a nuclear logging tool operating in inelastic neutron scattering mode. The apparent gas volume is determined using neutron porosity data from the nuclear logging tool operating in pulsed neutron capture ("PNC") mode. It is also possible to determine the total hydrocarbons volume using log data from formation thermal neutron capture cross-section measurements, or a cased hole formation resistivity tool, or using any other suitable technique known to those having ordinary skill in the art. The total hydrocarbons volume is then used to back-calculate the total hydrocarbons CDV at various formation depths using the logged C/O data. The resulting independently calculated total hydrocarbon CDV may be used for proper matching of log data and simulation results for history matching purposes.

By way of illustration, the principles and teachings of the invention will be described with respect to a pilot WAG injection project carried out in an oil-bearing field located in the Eastern Province of Algeria (including the Illizi and Ghadames basins separated by the Ahara ridge). The Lower Triassic (TAGI) shaly sandstone reservoir thickness varies from 15 to 75 m (meters) and reaches 150 m in the Ghadames basin. These variations reflect the configuration of the lower Triassic basement. The Triassic depositional environment involves numerous facies changes as well as restricted reservoir extensions. They are usually multi-layered producing zones, isolated by clay intercalations from flood plain deposition. Porosities range from 6 to 22% and often exceed 12% while permeability ranges from 10 to 1000 md (millidarcy). Reservoir qualities are controlled by diagenesis, dissolution of feldspars and carbonate, crystal feeding, mineralogical redistribution of clays, and various cementation processes. The formation water salinity is 270 kppm (thousand parts per million); formation oil is characterized by 42 API gravity (American Petroleum Institute), 216 m/m GOR (gas/oil ratio), 0.27 cp (centipoise) viscosity.

Figure 1:
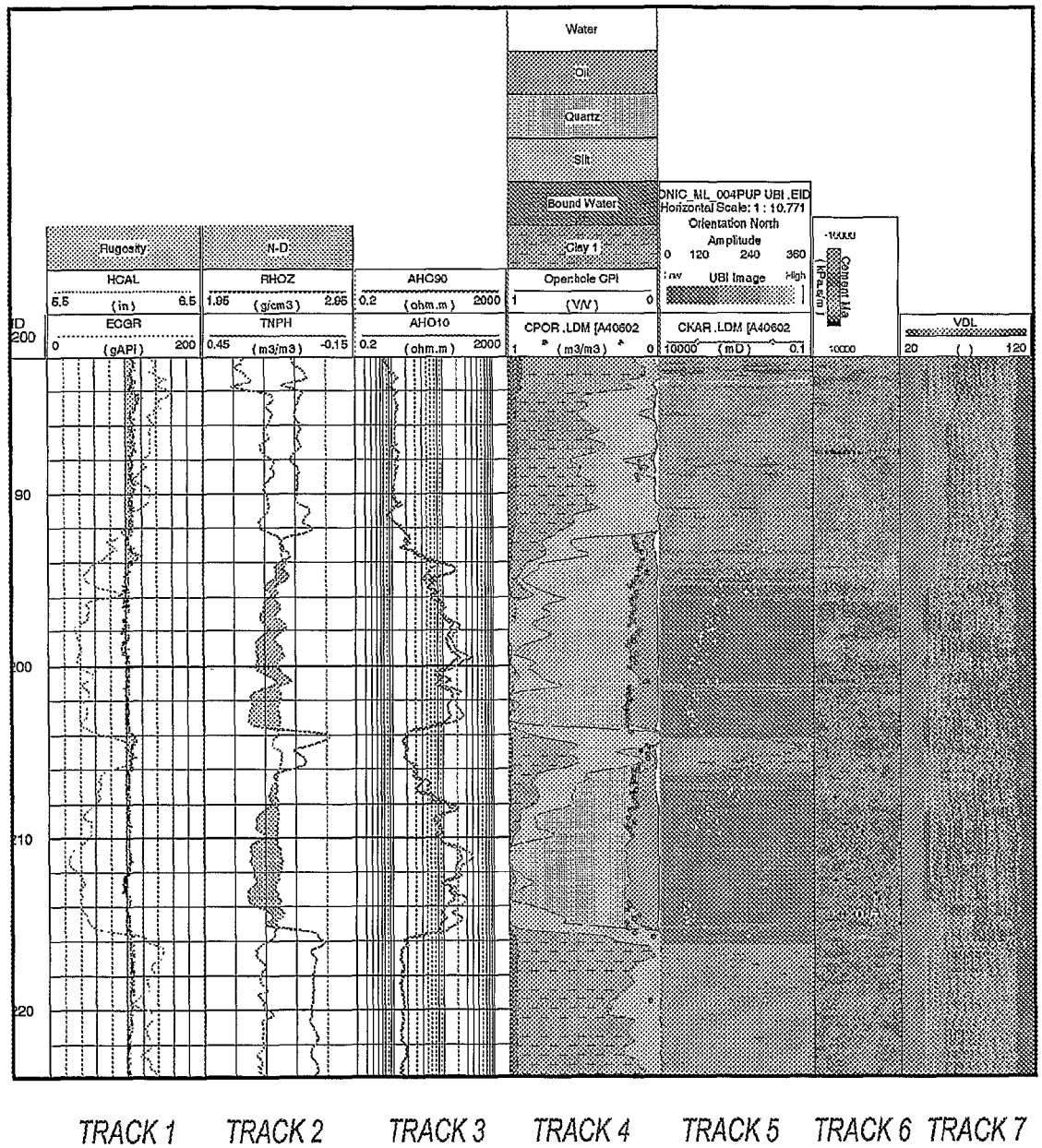
FIG. 1 illustrates the openhole log data acquired in the observation well, including porosity, lithology, saturation, and permeability.

An observation well was drilled 140 meters from the pilot WAG injection well to monitor the gas and water injection. The area of investigation is approximately 10 inches extending radially from the observation well. FIG. 1 illustrates the openhole logs for the observation well taken with standard logging tools known to those having ordinary skill in the art, such as Schlumberger's AIT™ (Array Induction Tool), PEX™ (Platform Express), UBI™ (Ultrasonic Borehole Imager). It should be noted that in FIG. 1, as with all the figures, the various names and labels of the different graphs, axes, tracks, and so forth, are specific to the Schlumberger tools that generated them. Information regarding these tools is readily available from Schlumberger Oilfield Services, Inc. and is therefore omitted herein order to avoid unnecessarily cluttering the description of the invention.

As can be seen, FIG. 1 shows the main openhole logs interpretation for GR (gamma ray), neutron porosity, density, and resistivity (Tracks 1-3, respectively), as well as the core data (Track 4), the ultrasonic image (Track 5), and the cement map and variable density log (Tracks 6 and 7, respectively) of the wellbore. Such reservoir properties can provide an estimate of how much hydrocarbons is present, how much may potentially be produced, and what kind of analysis should be considered for saturation monitoring. Cementing data confirm that the wellbore does not create a hydraulic connection between individual formation layers.

An extensive cased hole logging program was then prepared and implemented for the observation well to achieve the purpose of the pilot WAG project. One of the factors taken into account during the design of the logging program was high contrast between formation and injected water salinities (the latter is characterized by 20 kppm NaCl equivalent salinity). Because of the high salinity contrast, a determination of water saturation (and hence hydrocarbons volume) becomes complicated after water injection begins. To overcome this complication, an inelastic neutron scattering log was also selected for the logging program. It was also important that the logging program facilitate detection and estimation of changes in the hydrocarbon properties due to gas injection along with monitoring gas saturation. Therefore, a pulsed neutron capture tool, providing both capture cross-section and neutron porosity logs, was also added to the logging program. The logging tools used to acquire the above data may be any suitable logging tool or tools known to those having ordinary skill in the art. In a preferred embodiment, however, a single tool having both pulsed neutron capture (PNC) and inelastic neutron scattering capability is used, such as Schlumberger's RST™ (Reservoir Saturation Tool). The RST™ was selected because it has the ability to operate in both inelastic capture ("IC") and pulsed neutron capture ("Sigma") modes, as well as its characterized sensitivity to hydrocarbon properties changes.

A formation resistivity log was also added to the logging program for determining the total hydrocarbons volume. Any suitable tool known to those having ordinary skill in the art may likewise be used for the formation resistivity log, but preferably Schlumberger's CHFR™ (Cased Hole Formation Resistivity) tool is used. Information regarding this and other Schlumberger tools is readily available from Schlumberger Oilfield Services, Inc. and is therefore omitted here in order to avoid unnecessarily cluttering the description of the invention.

The above logging program, using the Schlumberger RST™ and CHFR™ tools, allows the following formation characteristics to be derived: (a) formation thermal neutron capture cross-section or SIGM (RST™ in Sigma mode), (b) near/far ratio thermal neutron porosity or TPHI (RST™ in Sigma mode), (c) formation carbon/oxygen ratio or C/O (RST™ in IC mode), and (d) formation resistivity (CHFR™).

Prior to starting the gas injection, a baseline run with the RST™ and CHFR™ tools was completed in the observation well to obtain the initial cased hole fluids saturation estimates. These initial estimates may then be compared to the estimates derived from the openhole data and subsequently used as a reference in the time-lapse analysis. After beginning the gas injection, the RST™ tool was run in intervals of 10-15 days to monitor the depletion of the formation during the gas injection. Then, in the water injection stage, the CHFR™ tool was added to the logging suite and ran on a regular basis. After six months of injections that covered two gas injection cycles and a water injection cycle, the time interval was increased to 25-30 days.

Figure 2:
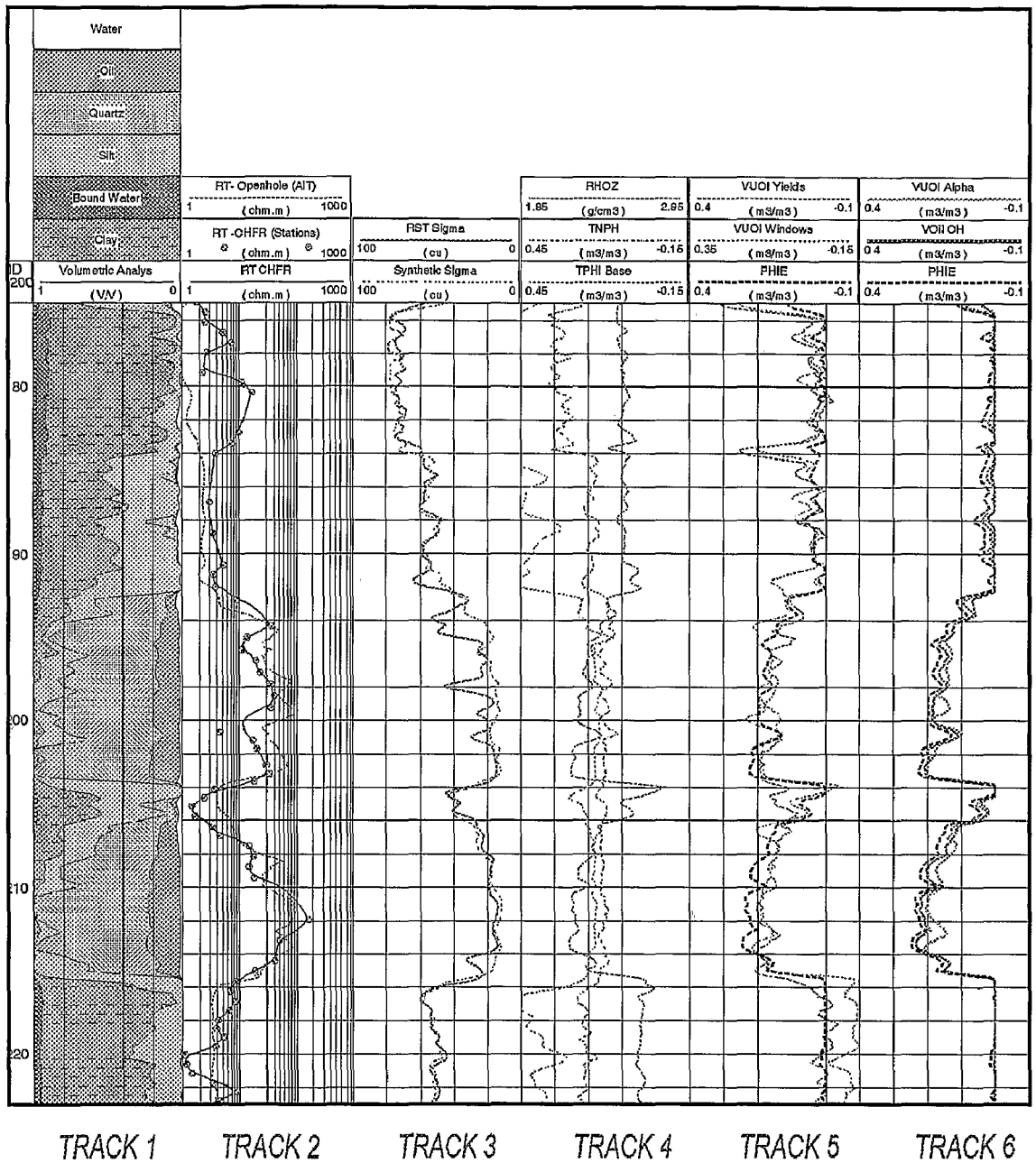
FIG. 2 illustrates log data acquired in the observation well after casing, but before injection of water or gas into the formation.

FIG. 2 shows the logs interpretation of the baseline run prior to starting the gas injection. As state above, the main goal of this run was to compare saturations measured in the cased hole log to the openhole log. Track 1 of FIG. 2 shows the core data while Track 2 indicates that comparing the cased hole results with the openhole resistivity shows good agreement between the estimates of the formation physical properties of the two logs (except for one zone where the cased hole resistivity is affected by the remains of the oil based mud in the annulus of the casing). The logs interpretation also shows that the openhole (i.e., initial) oil and water saturations may be reproduced using C/O measurements from the cased hole run. Thus, when the fluid properties, including formation water salinity and oil properties, are well known, formation resistivity and C/O measurements may be used to estimate the hydrocarbons saturation, thereby allowing the saturation changes to be monitored.

Track 3 shows the "RST Sigma" (i.e., measured formation thermal neutron capture cross-section) comparison to the "Synthetic Sigma" (i.e., formation thermal neutron capture cross-section computed based on reference porosity, lithology and saturation data). This track indicates that the subject measurement cannot be used directly to compute water saturation due to an incomplete knowledge of the formation lithology, but could be used to monitor saturation changes, since the formation matrix (i.e., the hard skeleton of the rock) is not expected to change over time.

Track 4 shows the bulk formation density and thermal neutron porosity logs acquired in the open hole in comparison with the thermal neutron porosity log acquired in the cased hole with a PNC device. The track demonstrates that the cased hole neutron porosity measurement is comparable to the one from the open hole, although more affected by lithology variations, and can be used for gas saturation monitoring with a time-lapse technique implementation.

Other tracks of interest include Track 5, which shows the apparent oil volumes calculated using C/O measurement from the RST™ tool, and Track 6, which displays the final Alpha-processed oil volume. The baseline oil CDV used for this interpretation was 0.525 g/cc. There are small differences between the openhole C/O derived oil volumes across the formation depth intervals that, since the C/O derived volume is similar in character to the porosity, are considered to represent the uncertainty in the depths of investigation, the effects of non-dispersed drilling invasion, and the measurement statistics.

During the first injection stage, the focus was mainly on the gas saturation changes. An initial assumption of injection gas TPHI of 0 pu (porosity unit) and negligible C/O compared to that of oil was made. Water saturation was assumed constant during the first injection stage. Initially, the gas volume was independently estimated from TPHI and C/O changes using the following equations:

$$V_{gasTPHI} = \Delta TPHI = TPHI_{Base} - TPHI_{Current} \quad (1)$$

$$V_{gasCOR} = \Delta V_{oilCOR} = V_{oil.BASE} - V_{oil.Current} \quad (2)$$

In Equation (1) above, $V_{gasTPHI}$ is the apparent volume of gas calculated using thermal neutron porosity (TPHI) data, $TPHI_{Base}$ is the initial or baseline TPHI (from the base cased hole RST™ run in Sigma mode), and $TPHI_{Current}$ is the current TPHI as measured by the RST™ tool in Sigma mode. Similarly, in Equation (2), $V_{gasCOR}$ is the apparent volume of gas calculated using C/O data, $V_{oil.BASE}$ is the initial or baseline oil volume (from the base cased hole RST™ run in IC mode), and $V_{oil.Current}$ is the current oil volume as derived from C/O data measured using the RST™ tool in IC mode (or some other suitable nuclear logging tool).

Figure 3:
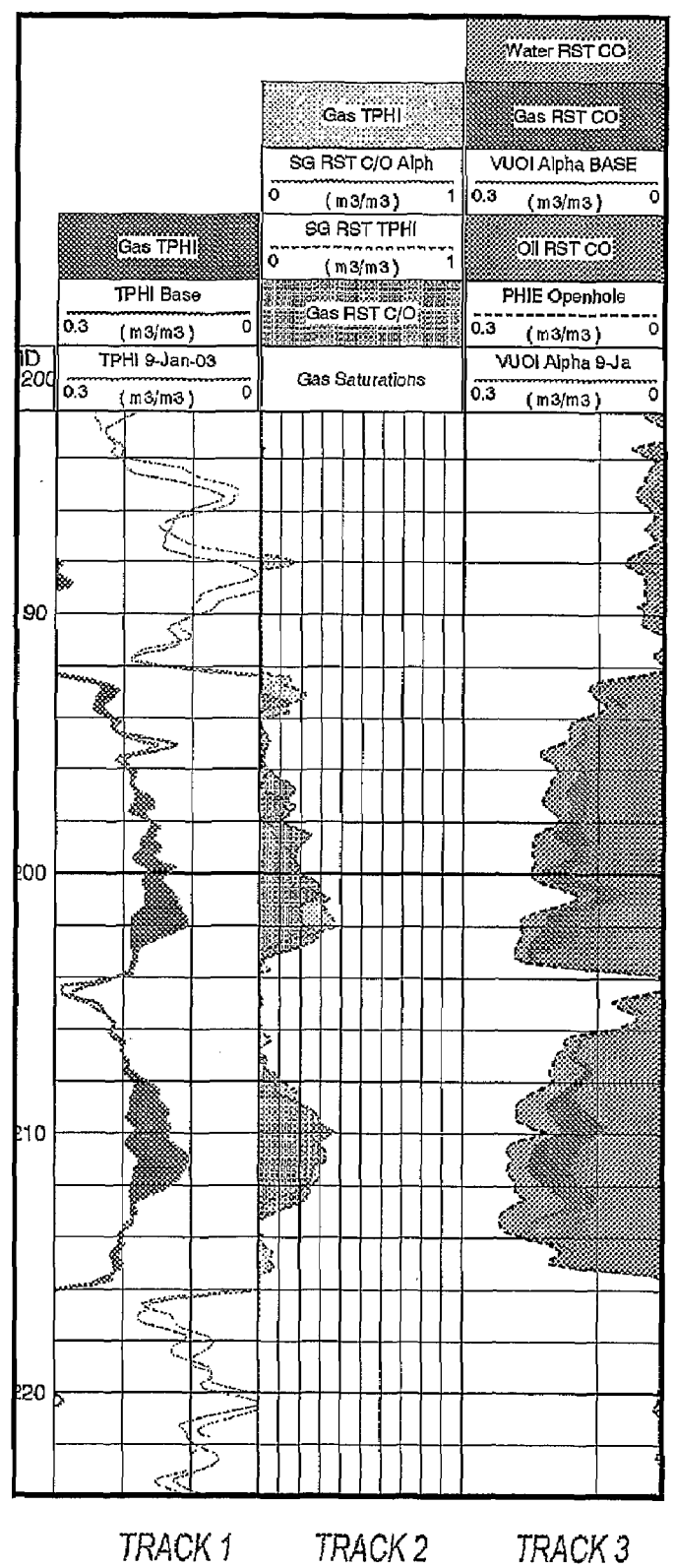
FIG. 3 illustrates log data acquired in the observation well showing the effect of gas injection on C/O and neutron porosity of the formation.

The comparison of the gas volumes/saturations estimated using the above technique is shown in FIG. 3, where Tracks 1-3 show TPHI logs from the base run and the current run; gas saturations (ratio of gas volume and porosity) derived from Sigma and IC mode data as described above; and RST™ oil volumes from the base run and the current run, with shadings indicating interpreted fluids distribution, respectively. As can be seen, while only gas is injected into the formation, two independent techniques (neutron porosity time-lapse and C/O analysis) yield the same oil and gas saturations. Note the good match between the gas saturations obtained from the TPHI and the C/O oil volumes change, indicating that by using a combination of these two techniques, the water saturation can be estimated correctly independent of any oil/gas properties and water salinity. The similarity of the effect of gas on TPHI and C/O apparent oil volume allows application of the same technique when the water saturation changes (after the arrival of the water front):

$$V_{gas} = \Delta TPHI \quad (3)$$

$$V_{oil} = V_{oilCOR} \quad (4)$$

$$V_{wat} = PHIE - V_{gas} - V_{oil} \quad (5)$$

In the foregoing equations, $V_{gas}$ is the apparent gas volume (from Equation (2) above), $V_{oil}$ is the apparent oil volume, $V_{wat}$ is the apparent water volume, and PHIE is the effective porosity (obtained from the open hole log data interpretation along with core data analyses).

The SIGM and formation resistivity obtained using the RST™ tool in Sigma mode and the CHFR™ tool (or other suitable nuclear logging and formation resistivity tool) was subsequently used to verify the accuracy of water saturation estimates using the above equations. However, because the formation water salinity was altered by the injection of water, the interpretation of the SIGM and formation resistivity actually solved for both the formation water and the fresh/injected water simultaneously. The water saturations obtained using this technique were considered to be in acceptable agreement with the C/O and TPHI analysis described above, but due to the difference in the vertical resolution and the depth of investigation, the SIGM and formation resistivity data were not routinely included in the final volumetric analysis.

Figures 4A, 4B:
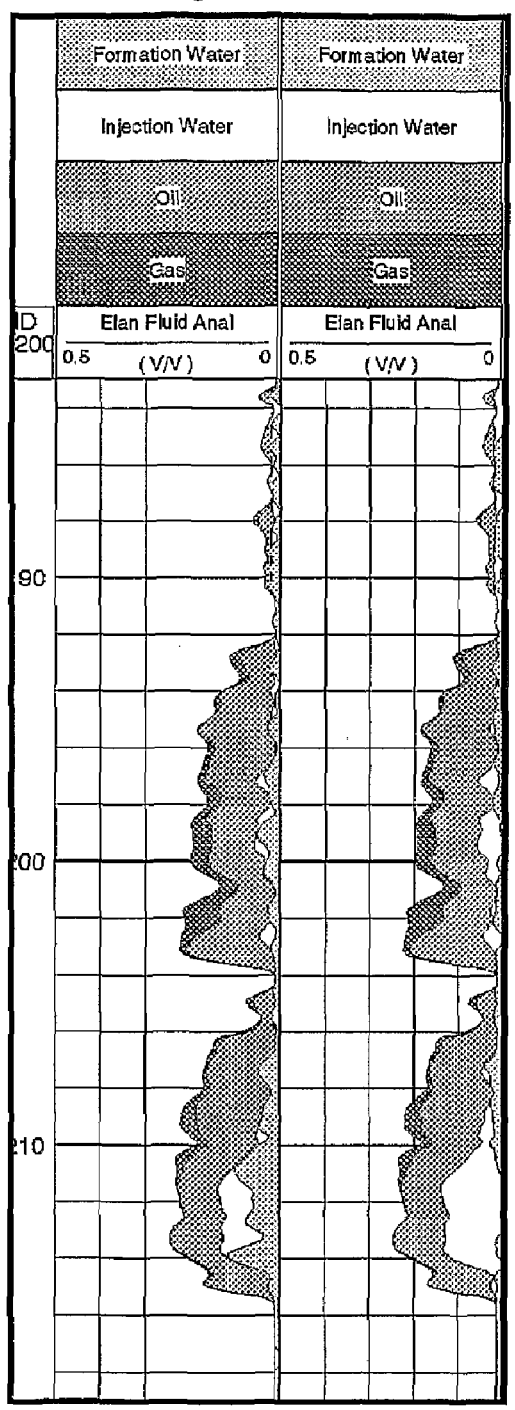
FIGS. 4A-4B illustrate log data acquired in the observation well showing complications in the use of formation thermal neutron capture cross-section and formation resistivity data for saturation analysis in a complex salinity environment.

The effect of the difference in the depth of investigation is illustrated in FIGS. 4A-4B, which shows some complications in the use of SIGM and formation resistivity data for saturation and salinity analysis. The complications are a result of the difference in the depth of investigation and also due to lateral heterogeneity of the fluids distribution in a highly dynamic process of reservoir flooding. Specifically, Tracks 1 and 2 of FIG. 4A show the water saturation estimates from SIGM and formation resistivity data, respectively, on the same date, while Track 1 of FIG. 4B shows the water saturation estimates from SIGM data on a different date, illustrating the dynamics of water salinity changes.

The above analysis may be performed via any suitable elemental analysis tool, such as Schlumberger's ELAN+™ elemental analysis software, using openhole porosity and mineral volumes as inputs along with the C/O derived oil volume, the TPHI derived apparent gas volume, the formation resistivity, and the SIGM data (if used). Such an elemental analysis tool is helpful to minimize the uncertainties of each measurement and to provide optimized results in a multiphase environment.

Figure 5:
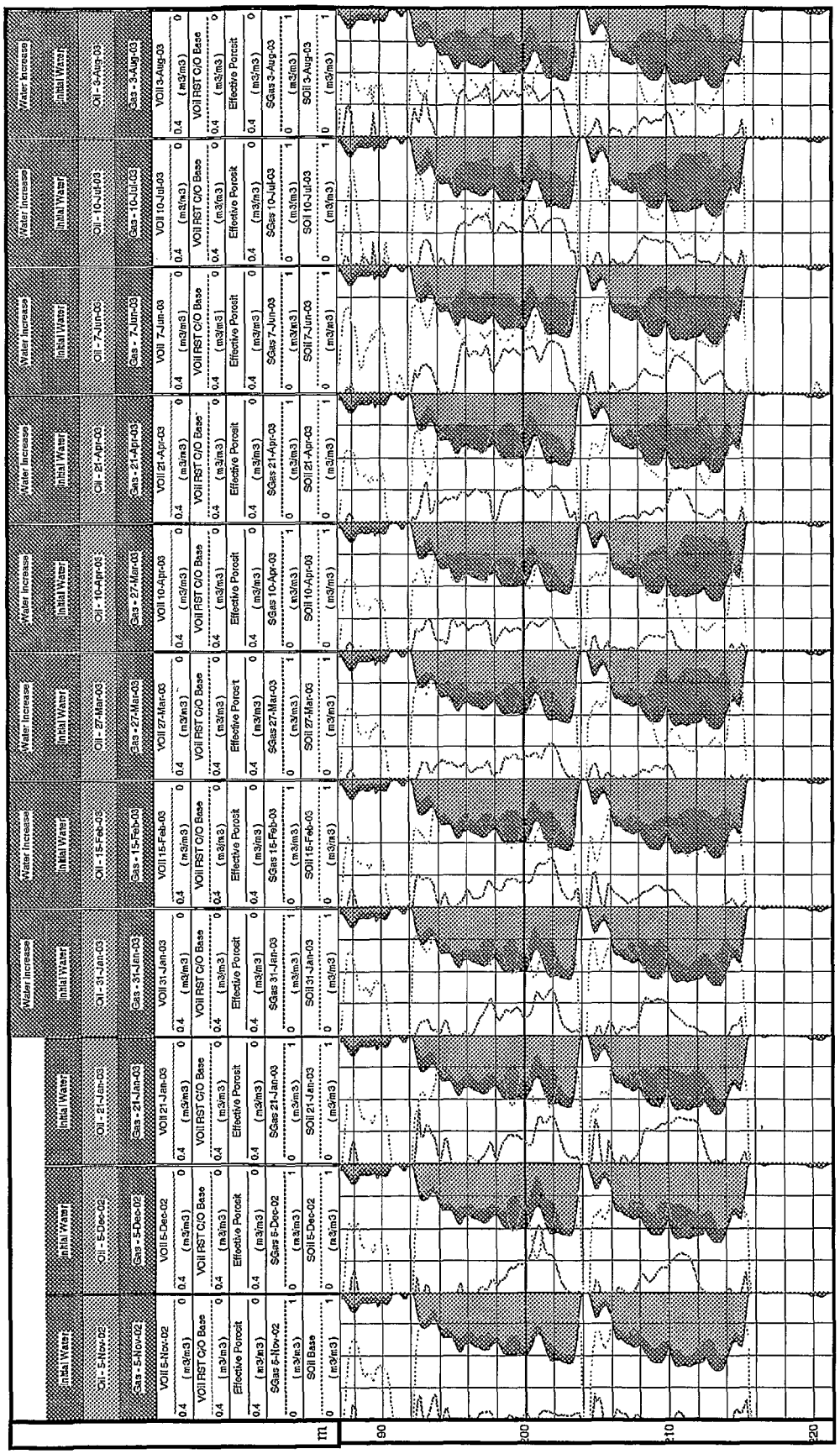
FIG. 5 illustrates log data acquired in the observation well showing saturation changes with time based on the assumption that the oil and gas phases are immiscible.

Based on the foregoing, using a combination of TPHI and C/O apparent oil volume, robust information on water saturation changes along with visible indication on gas injection effects and basic estimates of gas saturation were obtained. FIG. 5, Tracks 1-11, illustrate the changes in oil/gas/water saturations with time. Although any suitable formation resistivity tool may be used, the CHFR™ tool provided robust information on the formation resistivity and was shown to be the preferred tool for water detection at certain injection stages as well as for verification of water saturation estimates.

Thus, the saturation estimates derived using the basic equations described above provide robust detection of changes both in hydrocarbon properties and water saturation. However, the quantitative analysis results are based on an assumption of an immiscible process (i.e., constant fluid properties). Due to the oil and gas phases actually being miscible, the composition and density of each phase change with time and the changes are different for each hydraulically independent unit due to the different permeability. Also, as mentioned earlier, gravity segregation processes complicate the picture even further.

Moreover, oil density values obtained from a simulator model vary widely and may be both higher and lower than the initial oil density before gas injection. And the simulation model gas density may be as high as 0.41 g/cc or higher. Under these circumstances, the properties of each phase, such as the formation neutron porosity and the CDV, will also change, making the initial assumptions incorrect. Therefore, it becomes essential to either derive accurate gas/oil saturations or find another way to describe the hydrocarbon properties for history matching purposes (for example, by using the hydrocarbon CDV).

One approach is to derive corrected oil and gas saturation using oil and gas properties (i.e., density and composition) predicted from simulation models. Noticeable increases of gas saturation were seen, as expected; water saturation estimates remained the same within good tolerance. However, as the contrast between oil and gas properties decreases, the instability of these techniques also increases. Moreover, the results appear to be driven by the hydrocarbon properties predicted by the simulation models.

A second approach attempts to use log data and simulated hydrocarbons properties in the analysis. This second approach basically applies a density-based correction to the saturation estimates. However, the saturation estimates in this approach are also driven by simulation model densities. Moreover, the approach does not account for chemical composition changes, thus reducing the accuracy of the results.

Figure 6:
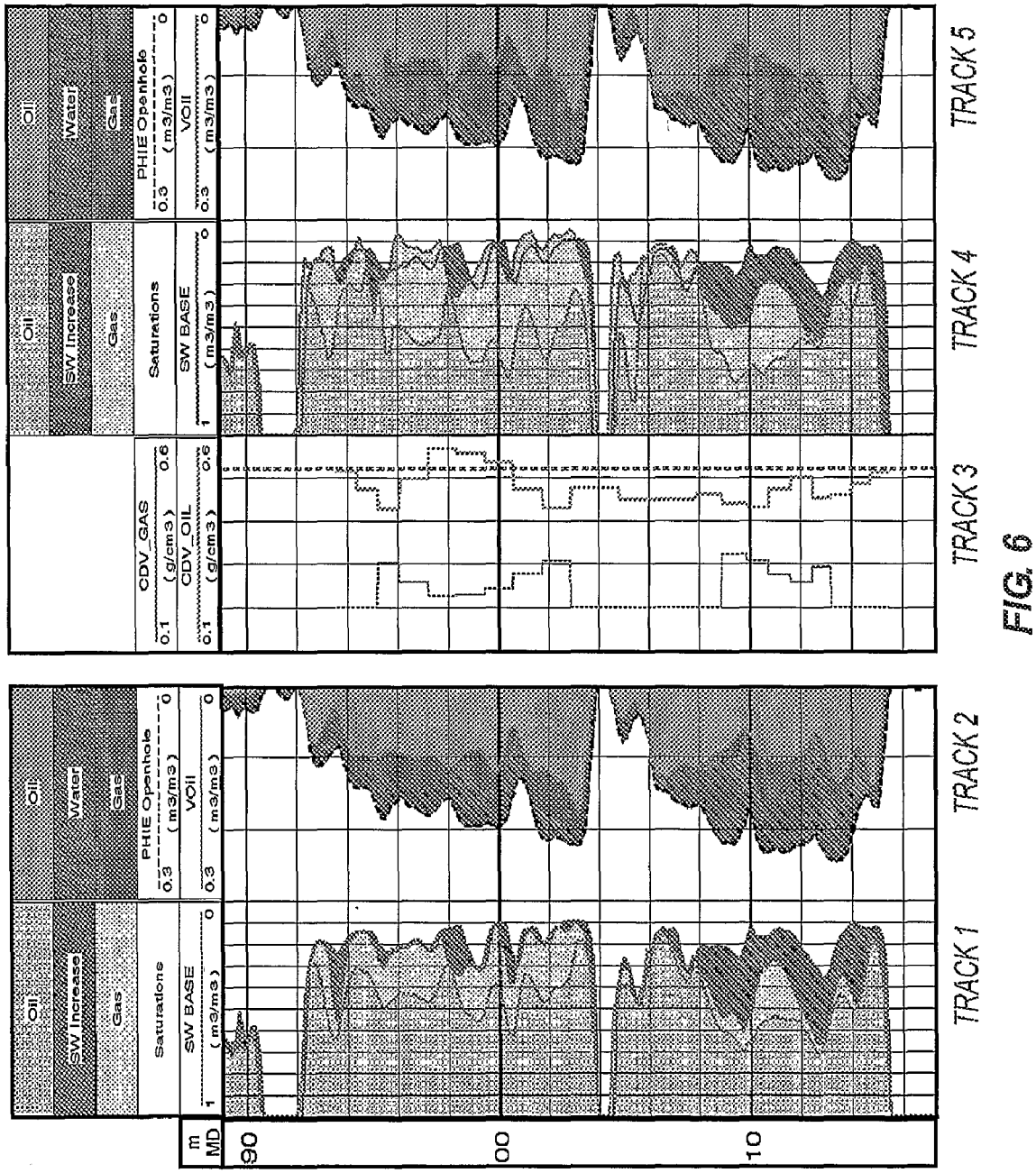
FIG. 6 illustrates log data acquired in the observation well showing the saturations based on an "immiscible" assumption versus saturations derived utilizing simulation model data.

The first approach is illustrated in FIG. 6, where Tracks 1 and 2 represent the oil, water and gas saturations and the fluid volumes distribution, respectively, assuming a conventional or immiscible approach. Track 3 shows the oil and gas CDVs predicted by the simulation model. Tracks 4 and 5 correspond to Tracks 1 and 2, but using the simulated hydrocarbons properties shown in Track 3. As can be seen, the oil and gas saturation estimates obtained assuming immiscibility appear to be inaccurate because of the oil/gas mutual miscibility. The oil and gas saturations estimated from the log data using simulated hydrocarbons properties are likely to be more accurate than those obtained with the "immiscible" approach, but the result is strongly driven by oil and gas properties derived from a simulation model, not by measured parameters. Thus, if the latter saturation estimates are used to adjust the simulation model (e.g., for history matching purposes), which is in turn used to recalculate the saturation estimates, the process potentially goes into an endless recursive procedure, with each iteration increasingly influenced by the simulated/predicted parameters. Consequently, any uncertainty in the log measurement may cause a growing error.

In accordance with embodiments of the invention, an alternative approach may be used for history matching purposes. The approach of the invention is based on the observation during the first gas and water injection cycles that the change in the hydrocarbon properties and or the oil displacement with gas affect the C/O measurement results and the TPHI with the same magnitude, regardless of the miscibility of the oil and gas phases. Therefore, the total hydrocarbon volume (and hence the water saturation) estimated using the immiscible approach is in fact accurate. This fact was confirmed with CHFR™ formation resistivity and RST™ SIGM measurements both during the gas injection phase, when the water saturation remained unchanged, and during the water injection phase.

Since the total hydrocarbons volume may be estimated with good precision, it may be used to back-calculate the total hydrocarbons CDV from the C/O measurements with good precision. This C/O derived total hydrocarbons CDV may then be compared to a total hydrocarbons CDV calculated from a simulation model, based on the hydrocarbons composition and density, and used for history matching purposes. Thus, in accordance with embodiments of the invention, the C/O derived total hydrocarbons CDV may be obtained by calculating the total hydrocarbons volume using the immiscible assumption as described above, then calculating the C/O derived apparent oil volume using a fixed CDV close to the average expected value (e.g., 0.4 g/cc in this case). Note that no porosity discrimination is applied to this apparent oil volume. The total hydrocarbons CDV may then be back-calculated using the following approximation:

$$CDV = V_{OIL\_REF} * 0.408 / V_{HYD} \qquad (6)$$

In Equation (6), $V_{OIL\_REF}$ is the C/O derived apparent oil volume using a fixed or baseline CDV and $V_{HYD}$ is the total hydrocarbons volume using the immiscible assumption. The coefficient 0.408 for Equation (6) above was found empirically using correlation between the CDV and apparent oil volume under given conditions, but may be derived using any suitable technique known to those having ordinary skill in the art, including iteratively (e.g., using apparent oil volumes computed with different CDVs), or analytically, based on the tool characterization.

Figure 7:
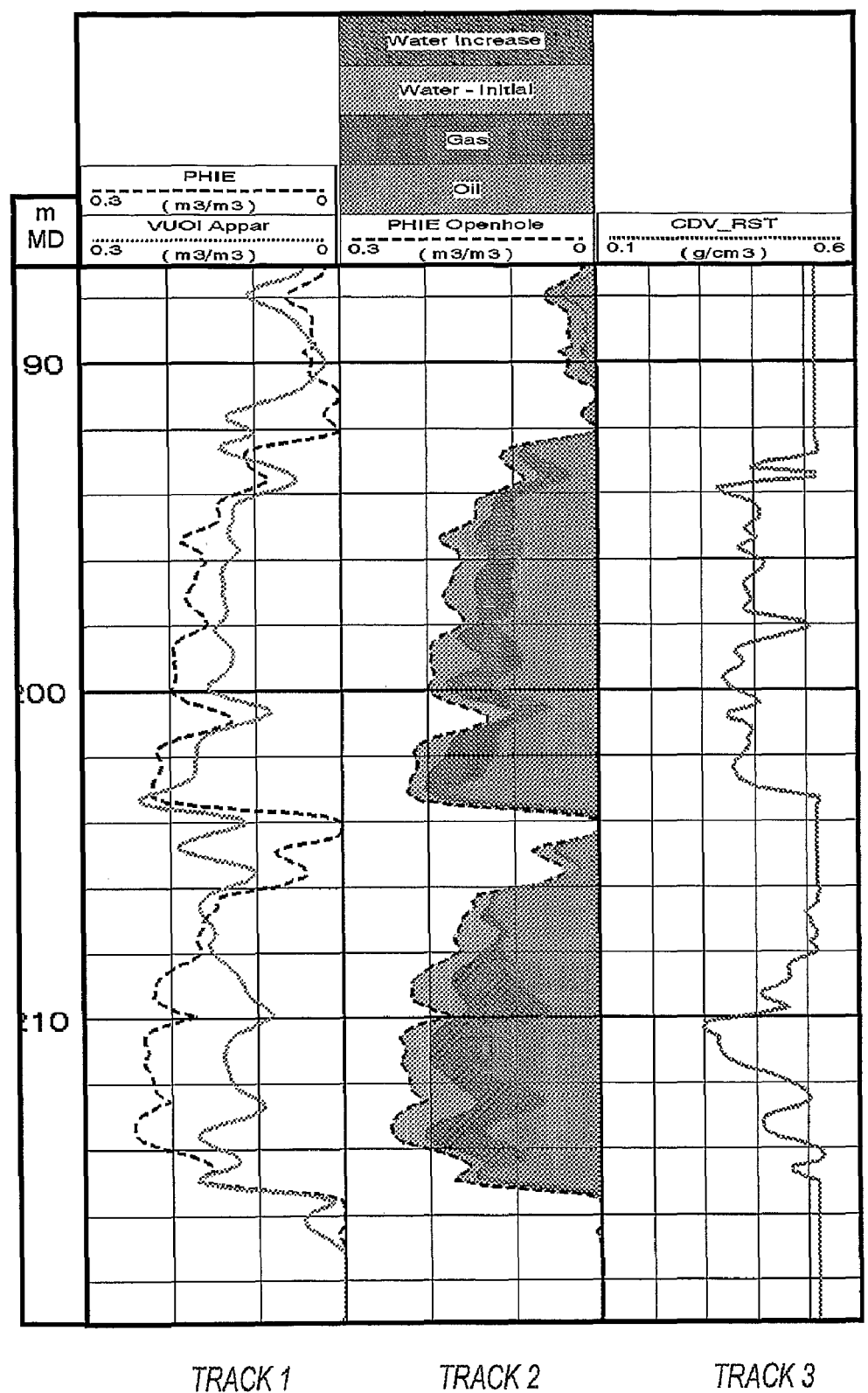
FIG. 7 illustrates log data acquired in the observation well showing the hydrocarbon CDV computed from apparent oil volume along with the neutron porosity inputs used.

The CDV computed using the technique of Equation (6) is shown in FIG. 7, where Tracks, 1 and 2 illustrate the apparent oil volume $V_{OIL\_REF}$ and the total hydrocarbons volume $V_{HYD}$, respectively. Track 3 represents the resulting total hydrocarbons CDV at various depth points investigated in the formation. The "total hydrocarbons volume" as used herein represents the volume of hydrocarbons contained in the formation inside the annulus defined by the investigation area around the observation well and one depth interval (e.g., 6 inches), relative to this formation volume.

Figure 8:
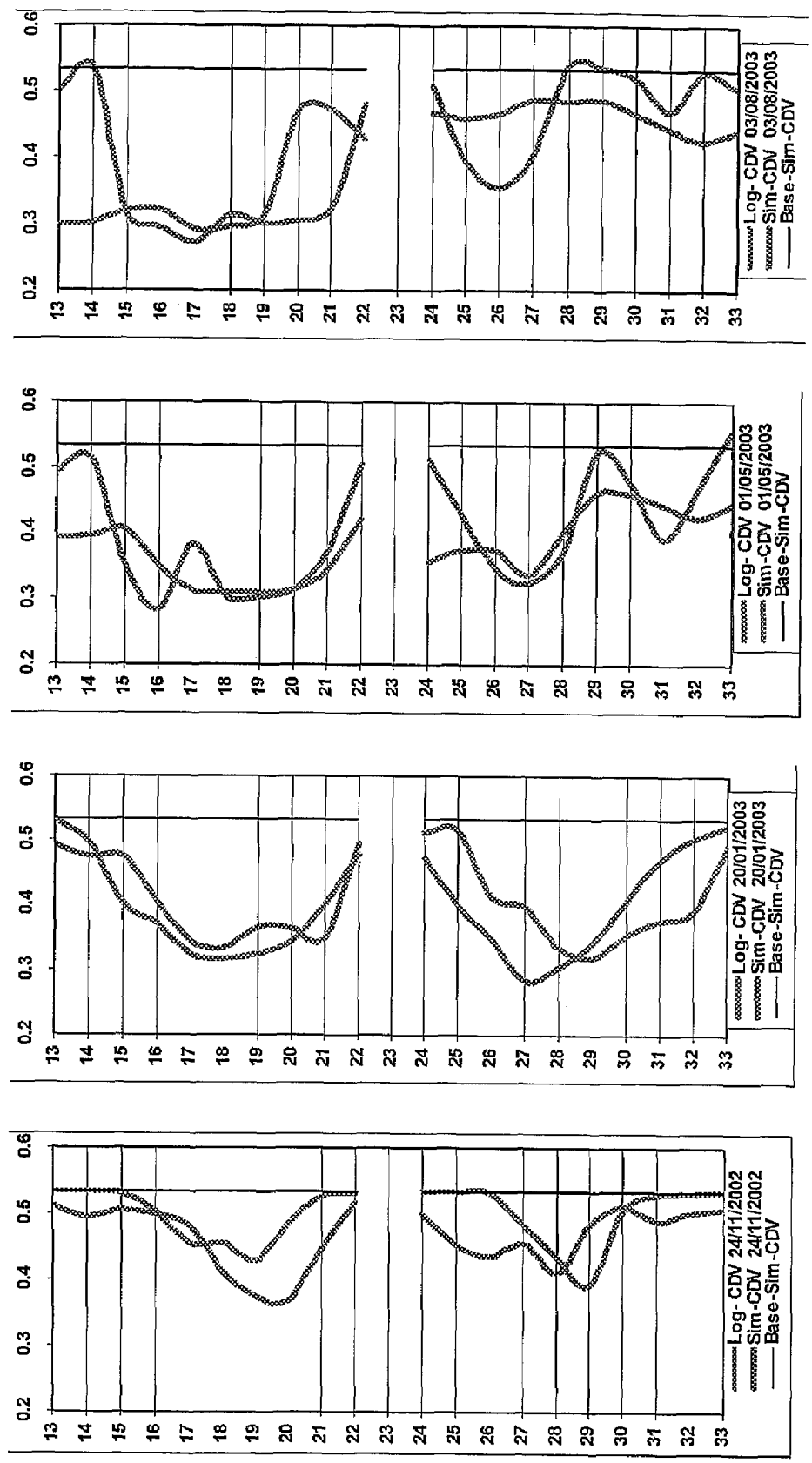
FIG. 8 illustrates the log-derived hydrocarbon CDV versus the hydrocarbon CDV derived from a simulation model at various dates.

FIG. 8, Tracks 1-4, show a comparison of the log-derived and simulated total hydrocarbons CDV profiles over multiple dates. The horizontal axis represents CDV units in g/cc (grams per cubic centimeter) and the vertical axis represents predefined layer numbers from the simulation model, with the depth increasing for higher layer numbers. As can be seen, the agreement between log-derived total hydrocarbons CDV and the simulated total hydrocarbons CDV appears to be very good.

Figure 9:
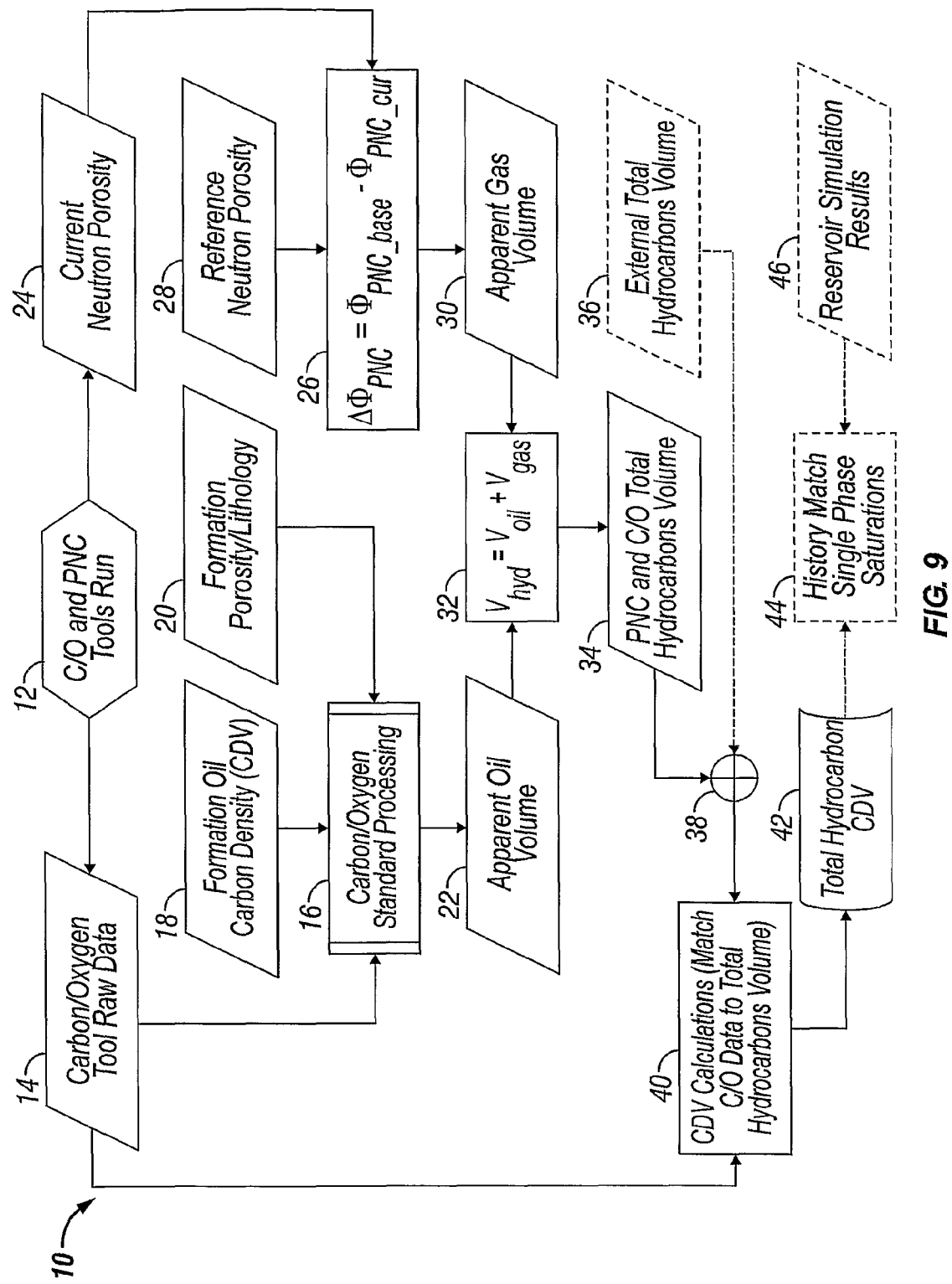
FIG. 9 illustrates a flow diagram for a method of calculating the hydrocarbon CDV according to embodiments of the invention.

FIG. 9 illustrates a flow diagram for a method 10 of calculating the total hydrocarbons CDV according to embodiments of the invention, with dashed lines indicating steps that are optional. As can be seen, the method 10 begins at block 12, where C/O and pulsed neutron capture (PNC) tools are run. The C/O and pulsed neutron capture tools may be separate tools, or they may be combined in a single nuclear logging tool, such as the Schlumberger RST™ tool mentioned previously herein. In either case, an initial run of the tools is conducted before the gas injection stage for comparison with the openhole log, and several subsequent logging runs are conducted during the gas and water injection stages. The raw C/O data from the C/O tool is recorded at block 14 and subsequently provided to a standard processing engine at block 16. The standard processing engine uses a fixed or initial CDV recorded at block 18 and known formation and porosity/lithology data recorded at block 20 together with the C/O data to calculate an apparent oil volume. The apparent oil volume is then recorded in block 22.

In block 24, the neutron porosity data from the pulsed neutron capture tool runs are recorded substantially in parallel with the C/O data recorded in block 14. The neutron porosity data is then combined at block 26 with a reference or baseline neutron porosity recorded at block 28 to determine an apparent gas volume. The apparent gas volume is based on the change in the porosity of the formation, as follows: $\Delta\Phi_{PNC} = \Phi_{PNC\_base} - \Phi_{PNC\_cur}$. The apparent gas, volume is then recorded at block 30.

At block 32, the apparent oil volume and the apparent gas volume is combined to produce a total hydrocarbons volume that is subsequently recorded at block 34. In some embodiments, an externally calculated total hydrocarbons volume, for example, from formation resistivity data or formation thermal neutron capture cross-section measurements, may also be recorded at block 36. This formation resistivity data may be obtained using any appropriate formation resistivity tool, such as the Schlumberger CHFR™ tool mentioned previously herein. The total hydrocarbons volume from either block 34 or block 36, or both, may then be used, as indicated by the optional input 38. The total hydrocarbons CDV may thereafter be back-calculated from the total hydrocarbons volume in block 40.

In some embodiments, the calculation of the total hydrocarbons CDV in block 40 uses substantially the same processing engine that was used in block 16 to calculate the apparent oil volume. That is to say, the processing engine in block 40 relies on essentially the same inputs to produce essentially the same outputs as the processing engine in block 16. However, whereas the processing engine in block 16 is used to calculate the apparent oil volume from a known/fixed CDV, the processing engine in block 40 is used to calculate a CDV that will result in a hydrocarbons volume that is substantially equal to the total hydrocarbons volume recorded in block 34 and/or block 36.

The CDV calculations may be done empirically, such as in the case of Equation (6), or they may be done iteratively, or in any manner known to those having ordinary skill in the art. In one embodiment, an iterative calculation means that at each depth level, or in any depth interval, the processing engine is run with an assumed, initial CDV. The hydrocarbon volume computed is then compared to the total hydrocarbons volume recorded in block 34 and/or block 36. If the agreement between the two hydrocarbon volumes is greater than a predefined uncertainty level, the procedure is repeated with a different CDV from a predefined range of CDVs until the agreement between the two hydrocarbon volumes is within the predefined uncertainty level. In any event, the result is a total hydrocarbons CDV that is then recorded in block 42.

The total hydrocarbons CDV may subsequently be used for any suitable application known to those having ordinary skill in the art. For example, in one embodiment, the total hydrocarbons CDV is used to determine the individual oil and gas phase saturation levels at the various borehole depth levels. The individual oil and gas phase saturation levels may then be used for comparison against saturation levels predicted by a simulation model, recorded at block 46, for history matching purposes. It is also possible to use the back-calculated total hydrocarbons CDV for direct comparison with the hydrocarbons CDV predicted by the simulation model in order to adjust the simulation model.

Figure 10:
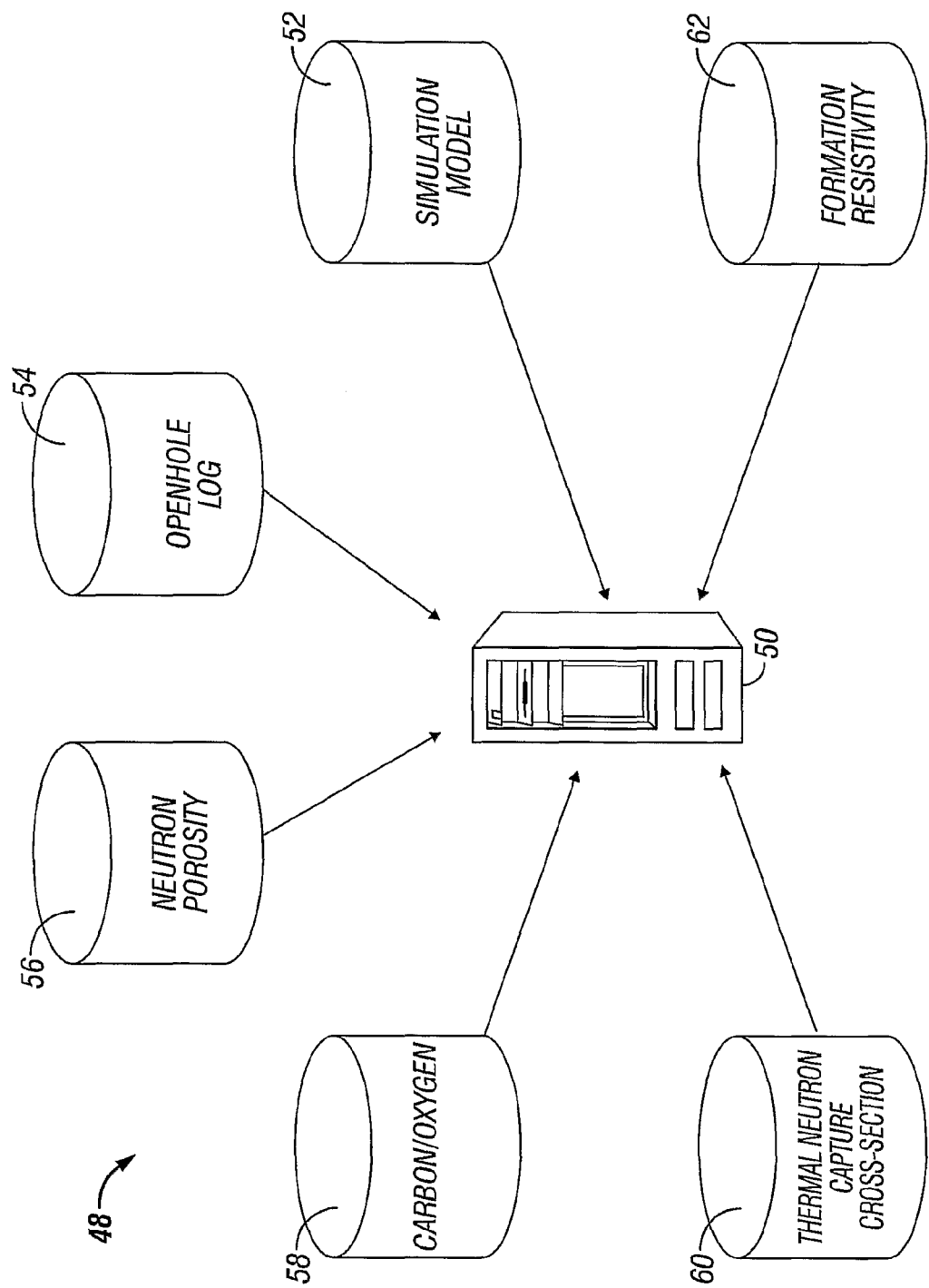
FIG. 10 illustrates a system that may be used to calculate the hydrocarbon CDV according to embodiments of the invention.

FIG. 10 illustrates a system 48 for calculating the total hydrocarbons CDV according to embodiments of the invention. The system 48 includes a processing unit 50 that is capable of performing the various computations and calculations described with respect to the method 10 of FIG. 9. In some embodiments, the processing unit 50 is a computer having a storage medium (not expressly shown) that is encoded with instructions for causing the computer to carry out one or more of the specific computations and calculations associated with back-calculating the total hydrocarbons CDV, described in FIG. 9. Also present are a number of databases connected (e.g., Ethernet, Internet, wireless, etc.) to the processing unit 50 for storing the data needed by the processing unit 50 to perform the back-calculation of the total hydrocarbons CDV.

The databases may include a simulation model database 52, an openhole log database 54, a neutron porosity database 56, a C/O database 58, a thermal neutron capture cross-section database 60, and a formation resistivity database 62. As before, the various types of data may be obtained using any available logging tool or tools known to those having ordinary skill in the art. It should be noted that although separate databases are shown in FIG. 10, two or more of the databases 52, 54, 56, 58, 60, and 62 may be combined together, or any one of the databases may be divided into several sub-databases, without departing from the scope of the invention. Moreover, the databases shown are not intended to be exclusive and other data and additional databases may be provided to the processing unit 50 as needed.

While the invention has been described with respect to a number of specific embodiments, those skilled in the art will recognize that the innovative concepts described may be modified and varied over a wide range of applications. Accordingly, the scope of patented subject matter should not be limited to any of the specific exemplary teachings discussed, but should instead be defined by the following claims.

What is claimed is:

1. A method for determining a total hydrocarbons carbon density value (CDV) in a multiphase environment, the method comprising:
    logging a wellbore for information, including carbon/oxygen log data;
    using the information from the wellbore to calculate apparent individual hydrocarbon saturations independently of individual hydrocarbons CDVs;
    calculating a total hydrocarbons saturation using the apparent individual hydrocarbon saturations;
    determining the total hydrocarbons CDV by using the total hydrocarbons saturation to back-calculate the total hydrocarbons CDV from the carbon/oxygen log data; and
    generating a comparison of the total hydrocarbons CDV and a simulated model.

2. The method according to claim 1, wherein the step of logging the wellbore for information includes logging the wellbore for neutron porosity log data.

3. The method according to claim 2, wherein the step of calculating the individual hydrocarbon saturations includes calculating an apparent gas volume using the neutron porosity log data.

4. The method according to claim 1, wherein the step of calculating the individual hydrocarbon saturations includes calculating an apparent oil volume using the carbon/oxygen log data.

5. The method according to claim 1, wherein the step of determining the total hydrocarbons CDV includes iteratively calculating a hydrocarbons saturation using different CDVs until one or more CDVs produce a hydrocarbons saturation that substantially matches the total hydrocarbons saturation.

6. The method according to claim 1, wherein the step of determining the total hydrocarbons CDV includes empirically calculating the total hydrocarbons CDV.

7. The method according to claim 1, wherein the apparent individual hydrocarbons saturations are also calculated independently of water salinity.

8. The method according to claim 1, wherein the step of logging the wellbore for information includes logging the wellbore for formation resistivity log data.

9. The method according to claim 8, further comprising calculating the total hydrocarbons saturation using the formation resistivity log data.

10. The method according to claim 9, further comprising determining the total hydrocarbons CDV using the total hydrocarbons saturation calculated from the formation resistivity log data and the carbon/oxygen log data.

11. The method according to claim 1, further comprising calculating individual hydrocarbon saturations using the total hydrocarbons CDV.

12. The method according to claim 11, further comprising performing history matching of an individual hydrocarbon saturations calculated from the total hydrocarbons CDV.

13. The method according to claim 1, wherein individual hydrocarbons in the multiphase environment are mutually miscible.

14. The method according to claim 1, wherein the multiphase environment is a water-alternated-gas injection environment.

15. A system for determining a total hydrocarbons carbon density value (CDV) in a multiphase environment, the system comprising:
    one or more databases having wellbore logging information stored thereon, including at least carbon/oxygen log data; and
    a processing unit connected to the one or more databases, the processing unit including a storage medium encoded with instructions for causing the processing unit to:
        calculate apparent individual hydrocarbon saturations using the wellbore logging information independently of individual hydrocarbons CDVs;
        calculate a total hydrocarbons saturation using the apparent individual hydrocarbon saturations; and
        determine the total hydrocarbons CDV by using the total hydrocarbons saturation to back-calculate the total hydrocarbons CDV from the carbon/oxygen log data.

16. The system according to claim 15, wherein the carbon/oxygen log data is obtained from a nuclear logging tool run in inelastic neutron scattering mode in the wellbore.

17. The system according to claim 15, wherein the one or more databases further includes neutron porosity log data stored thereon.

18. The system according to claim 17, wherein the neutron porosity log data is obtained from a nuclear logging tool run in pulsed neutron capture mode in the wellbore.

19. The system according to claim 15, wherein the one or more databases further has formation resistivity log data stored thereon.

20. A method of performing history matching for a simulated model of a multiphase environment, the method comprising:
    calculating a total hydrocarbons saturation based on wellbore log data;
    determining a total hydrocarbons carbon density value (CDV) from the total hydrocarbons saturation;
    generating a comparison of the total hydrocarbons CDV to a simulated hydrocarbons CDV calculated from the simulated model of the multiphase environment; and
    adjusting the simulated model of the multiphase environment based on the comparison of the total hydrocarbons CDV and the simulated hydrocarbons CDV.

21. The method according to claim 20, wherein the total hydrocarbons saturation is calculated from apparent individual hydrocarbon saturations, the apparent individual hydrocarbon saturations derived using a, fixed CDV that is independent of individual hydrocarbons CDVs.

22. The method according to claim 21, wherein the apparent individual hydrocarbon saturations include an apparent gas volume.

23. The method according to claim 21, wherein the apparent individual hydrocarbon saturations include an apparent oil volume.

24. The method according to claim 20, wherein the total hydrocarbons saturation is calculated from formation resistivity log data.

25. The method according to claim 20, wherein the total hydrocarbons saturation is calculated from formation thermal neutron capture cross-section log data.

26. A method for determining a total hydrocarbons carbon density value (CDV) in a multiphase environment, the method comprising:

logging a wellbore for information including formation resistivity log data;
using the formation resistivity log data to calculate a total hydrocarbons saturation;
determining the total hydrocarbons CDV by using the total hydrocarbons saturation to back-calculate the total hydrocarbons CDV from carbon/oxygen log data; and
generating a comparison of the total hydrocarbons CDV and a simulated model.

27. The method according to claim 26, wherein the step of determining the total hydrocarbons CDV includes iteratively calculating a hydrocarbons saturation using different CDVs until one or more CDVs produce a hydrocarbons saturation that substantially matches the total hydrocarbons saturation.

28. The method according to claim 27, wherein the step of determining the total hydrocarbons CDV includes empirically calculating the total hydrocarbons CDV.

* * * * *